US008520078B2

(12) United States Patent
Huang et al.

(10) Patent No.: US 8,520,078 B2
(45) Date of Patent: Aug. 27, 2013

(54) STORAGE DEVICE, DIGITAL VIDEO CAMCORDER WITH THEREOF AND SYSTEM WITH THEREOF

(75) Inventors: Wei-Cheng Huang, Taipei County (TW); Mei-Yi Tsai, Taipei County (TW); Shang-Yuan Yuan, Taipei County (TW)

(73) Assignee: Chicony Electronics Co., Ltd., New Taipei (TW)

( * ) Notice: Subject to any disclaimer, the term of this patent is extended or adjusted under 35 U.S.C. 154(b) by 293 days.

(21) Appl. No.: 12/818,142

(22) Filed: Jun. 17, 2010

(65) Prior Publication Data

US 2011/0211091 A1    Sep. 1, 2011

(30) Foreign Application Priority Data

Feb. 26, 2010 (TW) .............................. 99105709 A

(51) Int. Cl.
*H04N 5/225* (2006.01)
*H04N 5/232* (2006.01)

(52) U.S. Cl.
USPC ................. 348/207.11; 348/207.1; 348/211.1

(58) Field of Classification Search
USPC ................... 348/207.1, 207.2, 211.99, 211.1, 348/211.2, 207.11
See application file for complete search history.

(56) References Cited

U.S. PATENT DOCUMENTS

| 7,100,168 | B1 | 8/2006 | Wenzl |
| 2004/0090543 | A1* | 5/2004 | Suehiro .................... 348/231.99 |
| 2006/0078314 | A1* | 4/2006 | Hung et al. ................... 386/117 |
| 2009/0040331 | A1* | 2/2009 | Kitagawa .................... 348/222.1 |
| 2011/0043641 | A1* | 2/2011 | Furlan et al. ............... 348/207.1 |

FOREIGN PATENT DOCUMENTS

| CN | 1725198 A | 1/2006 |
| CN | 201041742 Y | 3/2008 |
| CN | 101425050 A | 5/2009 |
| JP | 2000078449 A | 3/2000 |

* cited by examiner

*Primary Examiner* — Kelly L Jerabek
(74) *Attorney, Agent, or Firm* — CKC & Partners Co., Ltd.

(57) ABSTRACT

A system with storage device includes a storage device and an electrical device. The storage device includes a storage unit, at least one hotkey and a first hot plug interface. The at least one hotkey generates a control instruction corresponding to the at least one hotkey when operated. The control instruction is written to a block for storing instructions of the storage unit. The electrical device includes a second hot plug interface and a processing unit. The storage device builds connection with the electrical device through the first hot plug interface and the second hot plug interface when the first hot plug interface is electrically connected with the second hot plug interface. The processing unit makes the second hot plug interface obtain the control instruction from the block for storing instructions of the storage unit through the first hot plug interface. The processing unit executes the control instruction.

13 Claims, 2 Drawing Sheets

STORAGE DEVICE, DIGITAL VIDEO CAMCORDER WITH THEREOF AND SYSTEM WITH THEREOF

RELATED APPLICATIONS

This application claims priority to Taiwan Application Serial Number 99105709, filed Feb. 26, 2010, which is herein incorporated by reference.

BACKGROUND

1. Technical Field

The present invention relates to a storage device, a digital video camcorder with thereof and a system with thereof.

2. Description of Related Art

As computer technology develops, there are more and more computer peripherals developed. USB (Universal Serial Bus) is a popular specification for computers to connect computer peripherals such as mice, keyboards, digital cameras, printers, personal media players, flash drives, and external hard drives. USB was designed for personal computers, but it has become commonplace on other devices such as smartphones, Personal Digital Assistances (PDAs) and video game consoles, and as a power cord between a device and an AC adapter plugged into a wall plug for charging.

The USB mass storage device class (UMS) is a set of computing communications protocols defined to run on the USB. The standard was designed to provide an interface to a variety of storage devices, such as conventional external disk drive or optical disk drives (ODD). Besides, there are more and more devices that support UMS, such as digital video camcorders, portable multimedia player, cellular phone, PDAs.

However, when UMS devices are connected to other electrical devices, the connected electrical devices take the UMS devices as passive storage devices, such that the UMS devices can only be accessed by the connected electrical devices. In other words, users can't operate the UMS devices to control the connected electrical devices.

SUMMARY

According to one embodiment of this invention, a system with storage device is provided. The system with storage device includes a storage device and an electrical device. The storage device includes a storage unit, at least one hotkey and a first hot plug interface. The at least one hotkey and the first hot plug interface are electrically connected with the storage unit respectively. The storage unit includes a block for storing instructions. The at least one hotkey generates a control instruction corresponding to the at least one hotkey when operated. The control instruction is written to the block for storing instructions of the storage unit. The electrical device includes a second hot plug interface and a processing unit, which are electrically connected with each other. The storage device builds connection with the electrical device through the first hot plug interface and the second hot plug interface when the first hot plug interface is electrically connected with the second hot plug interface. The processing unit includes an instruction-obtaining module and an instruction-executing module. The instruction-obtaining module makes the second hot plug interface obtain the control instruction from the block for storing instructions of the storage unit through the first hot plug interface. The instruction-executing module executes the control instruction.

According to another embodiment of this invention, a storage device is provided. The storage device includes a hot plug interface, a storage unit and at least one hotkey. The hot plug interface and the at least one hotkey are electrically connected with the storage unit respectively. The storage device builds connection with an electrical device through the hot plug interface when the electrical device is electrically connected with the hot plug interface. The storage unit includes a block for storing instructions. The at least one hotkey generates a control instruction corresponding to the at least one hotkey when operated. The control instruction is written to the block for storing instructions of the storage unit. When the electrical device detects that there is the control instruction stored in the block for storing instructions through the hot plug interface, the electrical device obtains the control instruction from the block for storing instructions through the hot plug interface and executes the control instruction.

According to another embodiment of this invention, a digital video camcorder with storage unit is provided. The digital video camcorder with storage unit includes an image-capturing device and a storage device, which are electrically connected with each other. The image-capturing device captures at least one image. The storage device includes a hot plug interface, a storage unit and at least one hotkey. The hot plug interface and the at least one hotkey are electrically connected with the storage unit respectively. The storage device builds connection with an electrical device through the hot plug interface when the electrical device is electrically connected with the hot plug interface. The storage unit includes a block for storing instructions. The at least one image is stored in the storage unit. The at least one hotkey generates a control instruction corresponding to the at least one hotkey when operated. The control instruction is written to the block for storing instructions of the storage unit. When the electrical device detects that there is the control instruction stored in the block for storing instructions through the hot plug interface, the electrical device obtains the control instruction from the block for storing instructions through the hot plug interface and executes the control instruction.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
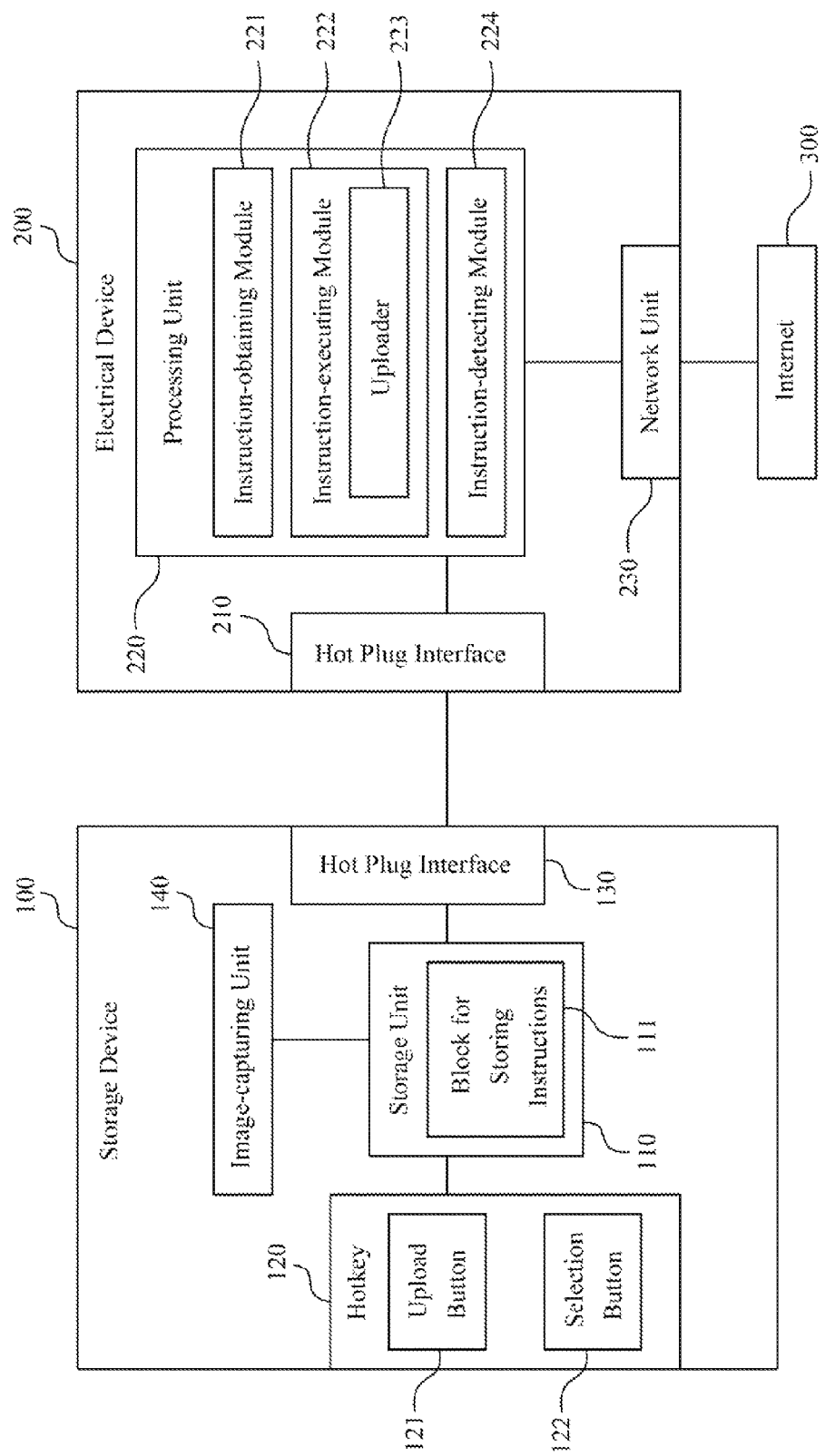
FIG. 1 illustrates a block diagram of a system with storage device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a block diagram of a system with storage device according to one embodiment of this invention. In the system with storage device, a control instruction corresponding to an operated hotkey of a storage device is written to the storage unit of the storage device. Hence, when an electrical device, which is electrically connected with the storage device, detects that there is the control instruction stored in the storage unit of the storage device, the electrical device executes the control instruction.

The system with storage device includes a storage device 100 and an electrical device 200. The storage device 100 includes a storage unit 110, at least one hotkey 120 and a hot plug interface 130. The at least one hotkey 120 and the hot plug interface 130 are electrically connected with the storage unit 110 respectively. The storage unit 110 includes a block for storing instructions 111. In one embodiment, a specified block may be assigned to be the block for storing instructions 111. In another embodiment, a file folder, which is assigned with a specified identification name, may be taken as the block for storing instructions 111. In other embodiments, other methods may be utilized to assign the block for storing instructions 111, which should not be limited in this disclosure. When the at least one hotkey 120 is operated, the at least one hotkey generates a control instruction corresponding to the operated one. The control instruction is written to the block for storing instructions 111 of the storage unit 110.

The electrical device 200 includes a hot plug interface 210 and a processing unit 220, which are electrically connected with each other. When the hot plug interface 130 of the storage device 100 is electrically connected with the hot plug interface 210 of the electrical device 200, the hot plug interface 210 of the electrical device 200 builds connection with the storage device 100 through the hot plug interface 130.

The processing unit 220 includes an instruction-obtaining module 221 and an instruction-executing module 222. The instruction-obtaining module 221 makes the hot plug interface 210 obtain the control instruction from the block for storing instructions 111 of the storage unit 110 through the hot plug interface 130. Wherein, the processing unit 220 may include an instruction-detecting module 224. The instruction-detecting module 224 makes the hot plug interface 210 detect if there is the control instruction stored in the block for storing instructions 111 of the storage unit 110 through the hot plug interface 130. If there is the control instruction stored in the block for storing instructions 111 of the storage unit 110, the instruction-detecting module 224 makes the instruction-obtaining module 221 start to obtain the control instruction.

The instruction-executing module 222 executes the obtained control instruction. Therefore, when the user operates the at least one hotkey 120 of the storage device, the electrical device 200 executes the instruction corresponding to the operated hotkey 120 without operating the electrical device 200.

At least one file stored in the storage device 100 can be uploaded to Internet 300 through the electrical device 200 when one of the at least one hotkey 120, which corresponds to upload function, is operated. Therefore, the at least one hotkey 120 may include an upload button 121, the electrical device 200 may include a network unit 230, and the instruction-executing module 221 may include an uploader 223. The network unit 230 is electrically connected with the processing unit 220. The electrical device 200 builds connection with Internet 300 through the network unit 230. When the upload button 121 is operated, the upload button 121 generates an upload instruction to upload at least one file for upload stored in the storage unit 110 to Internet 300 to be the control instruction. In addition, the at least one hotkey 120 may further include at least one selection button 122. Therefore, if there are several available files stored in the storage unit 110, the at least one selection button 122 can be operated to select the at least one file for upload from the available files stored in the storage unit 110.

In addition, if the storage device 100 can be utilized for capturing images, the image captured by the storage device 100 can be taken as the files for upload. Therefore, the storage device 100 may include an image-capturing unit 140, which is electrically connected with the storage unit 110. The image-capturing unit 140 captures at least one image, and the at least one image is stored to the storage unit 110 to be the at least one file for upload.

When the control instruction obtained by the instruction-executing module 221 is the upload instruction, the uploader 223 makes the hot plug interface 210 obtain the at least one file for upload from the storage unit 110 through the hot plug interface 130. Then, the uploader 223 uploads the at least one file for upload to Internet 300 through the network unit 230. Therefore, after the storage device 100 is electrically connected with the electrical device 200, files stored in the storage device 100 can be uploaded through the electrical device 200 by operating the at least one hotkey 120 of the storage device 100 but not the electrical device 200.

The hot plug interface 130 of the storage device 100 and the hot plug interface 210 of the electrical device 200 may follow Universal Serial Bus (USB) standard or other hot plug interface standard. When the hot plug interface 130 and the hot plug interface 210 follow USB standard, the hot plug interface 130 may utilize USB mass storage device class (UMS) standard to build connection with the electrical device 200. Hence, the storage device may be a digital video camcorder, a portable multimedia player, a mobile phone, a Personal Digital Assistant (PDA) or any other storage device, which follows UMS.

Figure 2:
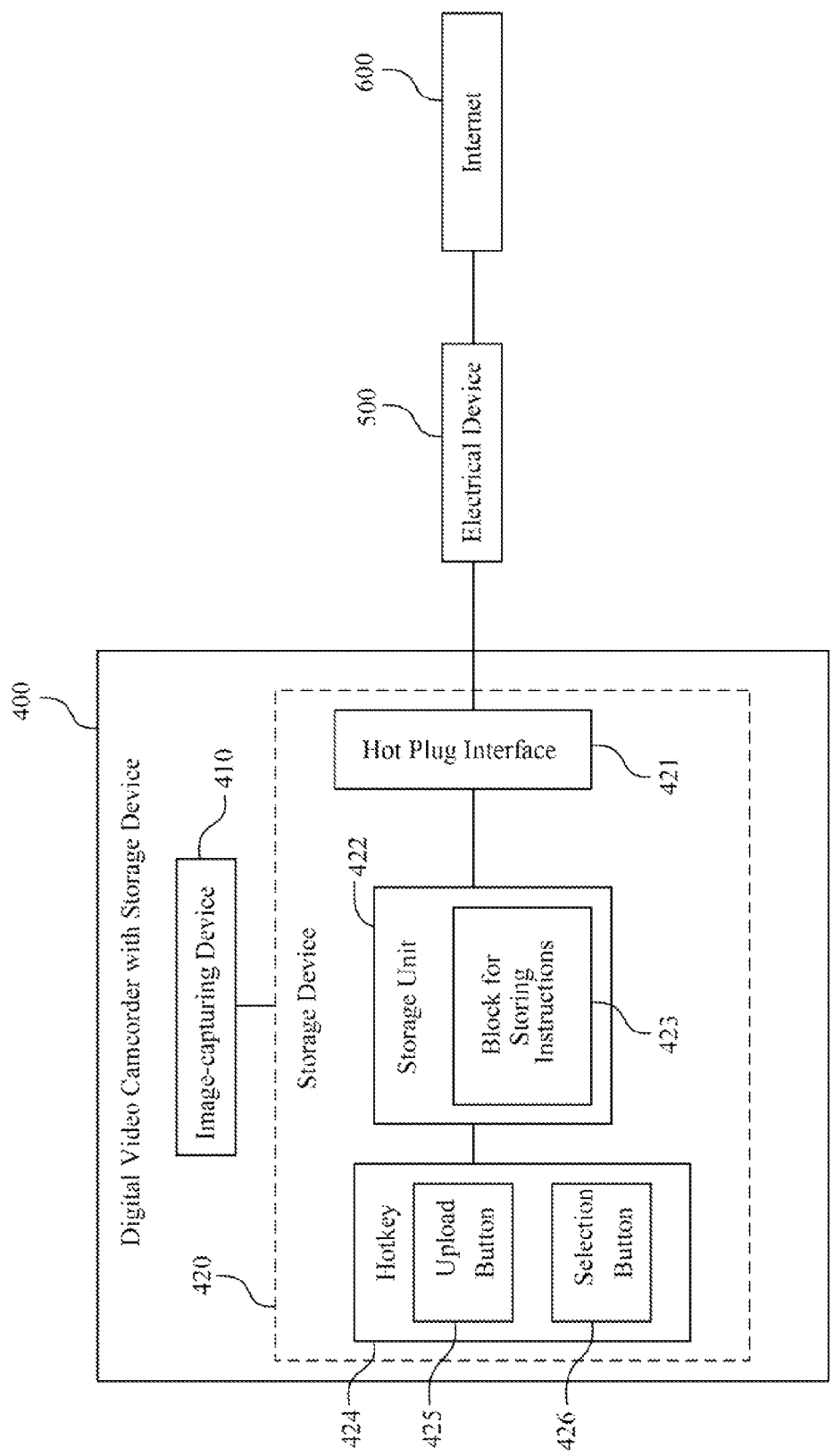
FIG. 2 illustrates a block diagram of a digital video camcorder with storage device according to another embodiment of this invention.

FIG. 2 illustrates a block diagram of a digital video camcorder with storage device according to another embodiment of this invention. When a hotkey of the digital video camcorder with storage device is operated, a control instruction corresponding to the operated hotkey is written to the storage unit of the digital video camcorder with storage device. Hence, when an electrical device, which is electrically connected with the digital video camcorder, detects that there is the control instruction stored in the storage unit of the digital video camcorder, the electrical device executes the control instruction.

The digital video camcorder with storage unit 400 includes an image-capturing device 410 and a storage device 420, which are electrically connected with each other. The image-capturing device 410 captures at least one image. The storage device 420 includes a hot plug interface 421, a storage unit 422 and at least one hotkey 424. The hot plug interface 421 and the at least one hotkey 424 are electrically connected with the storage unit 422 respectively. When an electrical device is electrically connected with the hot plug interface 421, the storage device 420 builds connection with the electrical device 500 through the hot plug interface 421. The storage unit 422 includes a block for storing instructions 423. The at least one image captured by the image-capturing device 410 is stored in the storage unit 422. When the at least one hotkey 424 is operated, a control instruction corresponding to the operated at least one hotkey 424 is generated. The control instruction is written to the block for storing instructions 423 of the storage unit 422. When the electrical device 500 detects that there is the control instruction stored in the block for storing instructions 423 through the hot plug interface 421, the electrical device 500 obtains the control instruction from the block for storing instructions 423 through the hot plug interface 421 and executes the obtained control instruction.

At least one images stored in the storage unit 422 can be uploaded to Internet 600 through the electrical device 500 when one of the at least one hotkey 424, which corresponds to upload function, is operated. Therefore, the at least one hotkey 424 may include an upload button 425. When the upload button 425 is operated, the upload button 425 generates an upload instruction to upload at least one file for upload stored in the storage unit 422 to Internet 600 to be the control instruction. In addition, the at least one hotkey 424 may further include at least one selection button 426. Therefore, if the number of the at least one image stored in the storage unit 422 is more than one, the at least one selection button 426 can be operated to select at least one of the images stored in the storage unit 422 to be uploaded. Therefore, if there are several images stored in the storage unit 422, the at least one selection button 426 can be operated to select the at least one image to be uploaded.

The hot plug interface 421 may follow USB standard or other hot plug interface standard. When the hot plug interface 421 follows USB standard, the hot plug interface 421 may utilize UMS standard to build connection with the electrical device 500.

Above all, when an electrical device is electrically connected with a storage device through a hot plug interface, the electrical device can be operated through operating the hotkey of the storage device but not the electrical device. In addition, files stored in the storage device can be uploaded through the electrical device by operating the upload hotkey of the storage device without operating the electrical device. Besides, when the storage device follows UMS standard, which makes the electrical device take the storage device as a passive storage device, users can still control the electrical device by operating the storage device.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system with storage device, comprising:
   a storage device, comprising:
      a storage unit, comprising a block for storing instructions;
      at least one hotkey, electrically connected with the storage unit, wherein the at least one hotkey generates a control instruction corresponding to the at least one hotkey when operated, and the control instruction is written to the block for storing instructions of the storage unit; and
      a first hot plug interface, electrically connected with the storage unit; and
   an electrical device, comprising:
      a second hot plug interface, wherein the storage device builds connection with the electrical device through the first hot plug interface and the second hot plug interface utilizing USB mass storage device class (UMS) standard when the first hot plug interface is electrically connected with the second hot plug interface, such that the storage device is taken as a passive storage device; and
      a processing unit, electrically connected with the second hot plug interface, the processing unit comprising:
         an instruction-obtaining module, making the second hot plug interface obtain the control instruction from the block for storing instructions of the storage unit through the first hot plug interface; and
         an instruction-executing module, executing the control instruction;
      wherein the processing unit further comprises an instruction-detecting module, making the second hot plug interface detect if there is the control instruction stored in the black for storing instructions of the storage unit through the first hot plug interface, wherein the instruction-detecting module makes the instruction-obtaining module start to obtain the control instruction if there is the control instruction stored in the block for storing instructions of the storage unit;
      wherein in response to detection of the control instruction stored in the block for storing instructions of the storage unit by the instruction-detecting module, the electrical device performs an action with respect to a file stored in the storage unit of the storage device by the instruction-executing module thereof executing the control instruction.

2. The system with storage device of claim 1, wherein the electrical device further comprises a network unit, the network unit is electrically connected with the processing unit, the instruction-executing module comprises:
   an uploader, wherein the uploader makes the second hot plug interface obtain at least one file for upload through the first hot plug interface and uploads the at least one file for upload to Internet through the network unit when the control instruction is an upload instruction to upload the at least one file for upload to Internet.

3. The system with storage device of claim 2, wherein the at least one hockey comprises:
   an upload button, generating the upload instruction when operated.

4. The system with storage device of claim 2, wherein the storage device further comprises:
   an image-capturing unit, electrically connected with the storage unit, wherein the image-capturing unit captures at least one image, and the at least one image is stored to the storage unit to be the at least one file for upload.

5. The system with storage device of claim 2, wherein the at least one hotkey comprises:
   at least one selection button, wherein the at least one selection button is operated to select the at least one file for upload from a plurality of available files stored in the storage unit.

6. The system with storage device of claim 1, wherein the first hot plug interface and the second hot plug interface are Universal Serial Bus (USB).

7. A storage device, comprising:
   a hot plug interface, wherein the storage device builds connection with an electrical device through the hot plug interface utilizing USB mass storage device class (UMS) standard when the electrical device is electrically connected with the hot plug interface, such that the storage device is taken as a passive storage device;
   a storage unit, electrically connected with the hot plug interface, wherein the storage unit comprises a block for storing instructions; and
   at least one hotkey, electrically connected with the storage unit, wherein the at least one hotkey generates a control instruction corresponding to the at least one hotkey when operated, and the control instruction is written to the block for storing instructions of the storage unit, wherein the electrical device detects if there is the control instruction stored in the block for storing instructions of the storage unit through the hot plug interface, wherein the electrical device starts to obtains the control instruction from the block for storing instructions through the hot plug interface if there is the control instruction stored in the block for storing instructions of the storage unit, wherein in response to detection of the control instruction stored in the block for storing instructions of the storage unit by the electrical device, the electrical device performs an action with respect to a file stored in the storage unit of the storage device by the electrical device thereof executing the control instruction.

8. The storage device of claim 7, wherein the at least one hotkey comprises:

an upload button, generating an upload instruction to upload at least one file for upload to Internet to be the control instruction when operated, wherein the at least one file for upload is stored in the storage unit, wherein the electrical device obtains the at least one file for upload from the storage unit through the hot plug interface and upload the at least one file for upload to Internet through a network unit of the electrical device when the upload instruction, which is generated to be the control instruction, is executed.

9. The storage device of claim 8, further comprising:

an image-capturing unit, electrically connected with the storage unit, wherein the image-capturing unit captures an image, and the image is stored in the storage unit to be the at least one file for upload.

10. The storage device of claim 8, wherein the at least one hotkey comprises:

at least one selection button, wherein the at least one selection button is operated to select the at least one file for upload from a plurality of available files stored in the storage unit.

11. A digital video camcorder with storage unit, comprising:

an image-capturing device, capturing at least one image; and a storage device, electrically connected with the image-capturing device, wherein the storage device comprises:

a hot plug interface, wherein the storage device builds connection with an electrical device through the hot plug interface utilizing USB mass storage device class (UMS) standard when the electrical device is electrically connected with the hot plug interface, such that the storage device is taken as a passive storage device;

a storage unit, electrically connected with the hot plug interface and comprising a block for storing instructions, wherein the at least one image is stored in the storage unit; and at least one hotkey, electrically connected with the storage unit, wherein the at least one hotkey generates a control instruction corresponding to the at least one hotkey when operated, and the control instruction is written to the block for storing instructions of the storage unit, wherein the electrical device detects if there is the control instruction stored in the block for storing instructions of the storage unit through the hot plug interface, wherein the electrical device starts to obtain the control instruction from the block for storing instructions through the hot plug interface if there is the control instruction stored in the block for storing instructions of the storage unit, wherein in response to detection of the control instruction stored in the block for storing instructions of the storage unit by the electrical device, the electrical device performs an action with respect to a file stored in the storage unit of the storage device by the electrical device thereof executing the control instruction.

12. The digital video camcorder with storage unit of claim 11, wherein the at least one hotkey comprises:

an upload button, generating an upload instruction to upload the at least one image for upload to Internet to be the control instruction when operated, wherein the electrical device obtains the at least one image from the storage unit through the hot plug interface and upload the at least one image to Internet through a network unit of the electrical device when the upload instruction, which is generated to be the control instruction, is executed.

13. The digital video camcorder with storage unit of claim 12, wherein the at least one hotkey comprises:

at least one selection button, wherein if the number of the at least one image stored in the storage unit is more than one, the at least one selection button is operated to select at least one of the images stored in the storage unit to be uploaded.

\* \* \* \* \*